(12) United States Patent
Chiu et al.

(10) Patent No.: US 9,168,951 B2
(45) Date of Patent: Oct. 27, 2015

(54) JACKKNIFE CONDITION FOR BACKING UP OF A VEHICLE ATTACHED TO A LONG WHEELBASE DUAL AXLE TRAILERS

(71) Applicant: Honda Motor Co., Ltd., Minato-ku Tokyo (JP)

(72) Inventors: Jimmy Chiu, Sunnyvale, CA (US); Ambarish Goswami, Fremont, CA (US)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 13/968,312

(22) Filed: Aug. 15, 2013

(65) Prior Publication Data

US 2014/0277941 A1 Sep. 18, 2014

Related U.S. Application Data

(60) Provisional application No. 61/784,740, filed on Mar. 14, 2013.

(51) Int. Cl.
*B62D 13/06* (2006.01)
*B62D 13/02* (2006.01)

(52) U.S. Cl.
CPC .............. *B62D 13/06* (2013.01); *B62D 13/025* (2013.01)

(58) Field of Classification Search
None
See application file for complete search history.

(56) References Cited

U.S. PATENT DOCUMENTS

| | | | |
|---|---|---|---|
| 5,579,228 A * | 11/1996 | Kimbrough et al. | 701/41 |
| 6,268,800 B1 | 7/2001 | Howard | |
| 6,838,979 B2 | 1/2005 | Deng et al. | |
| 6,854,557 B1 | 2/2005 | Deng et al. | |
| 7,694,993 B2 | 4/2010 | Timmons, Jr. | |
| 7,715,953 B2 * | 5/2010 | Shepard | 701/1 |
| 2004/0215374 A1 * | 10/2004 | Shepard | 701/1 |
| 2006/0103511 A1 | 5/2006 | Lee et al. | |
| 2009/0032273 A1 * | 2/2009 | Hahn | 172/2 |
| 2012/0271512 A1 | 10/2012 | Rupp et al. | |
| 2013/0024064 A1 | 1/2013 | Shepard | |
| 2013/0179038 A1 * | 7/2013 | Goswami et al. | 701/42 |
| 2014/0277941 A1 * | 9/2014 | Chiu et al. | 701/41 |

OTHER PUBLICATIONS

Altafini, C. et al., A Feedback Control Scheme for Reversing a Truck and Trailer Vehicle, *IEEE Transactions on Robotics and Automation*, Dec. 2001, pp. 915-922, vol. 17, No. 6.

(Continued)

*Primary Examiner* — Redhwan K Mawari
*Assistant Examiner* — Edward Torchinsky
(74) *Attorney, Agent, or Firm* — Fenwick & West LLP (57) ABSTRACT

A jackknife warning condition controller and control method notifies a driver of a potential jackknife situation while backing up a vehicle with an attached trailer. The vehicle has a front axle with steerable front wheels controlled by the driver and a rear axle with non-steerable rear wheels. The trailer has a front axle with non-steerable front wheels and a rear axle with steerable rear wheels controlled by a trailer steering controller. The jackknife controller receives an operator-controlled vehicle steering angle and a measured hitch angle. The jackknife warning condition controller determines a directional jackknife warning condition and compares the measured hitch angle with the determined directional jackknife warning condition. If the measured hitch angle satisfies the directional jackknife warning condition then a notification is sent to the driver.

20 Claims, 7 Drawing Sheets

(56) References Cited

OTHER PUBLICATIONS

PCT International Search Report and Written Opinion, PCT Application No. PCT/US2014/018448, Jun. 18, 2014, ten pages.

Pradalier, C. et al., "Experiments in autonomous reversing of a tractor-trailer system," *In Proceedings of the 6${}^{th}$ International Conference on Field and Service Robotics*, 2008, pp. 475-484, Chamonix, France.

* cited by examiner

JACKKNIFE CONDITION FOR BACKING UP OF A VEHICLE ATTACHED TO A LONG WHEELBASE DUAL AXLE TRAILERS

RELATED APPLICATIONS

This application claims the benefit of U.S. provisional application No. 61/784,740 entitled "Kinematic and Dynamic Modeling of Articulated Vehicles" filed on Mar. 14, 2013, the content of which is incorporated by reference herein in its entirety.

BACKGROUND

The act of backing up a vehicle with an attached trailer can be a challenging maneuver even for individuals with considerable driving experience. Such maneuvers often require counterintuitive inputs, making them error-prone, cumbersome, frustrating, and dangerous, especially for inexperienced drivers. A common mistake when backing up a vehicle and trailer is to "jack knife" or "bind" the vehicle and trailer during the reverse motion. When this occurs, the driver is prevented from being able to steer the vehicle and trailer any further along its desired path. Backup maneuvers are particularly difficult with long wheelbase dual-axle trailers (as compared to single axle trailers), thus leaving the driver even more prone to jack knifing or binding.

APPLICATION SUMMARY

A controller and method for determining a jackknife condition of a vehicle-trailer system in a reverse drive maneuver. A trailer and a vehicle are coupled at a hitch. The vehicle has a front axle with steerable front wheels and a rear axle with non-steerable rear wheels. The trailer has a rear axle with steerable rear wheels and a front axle with non-steerable front wheels. A controller receives an operator-controlled vehicle steering angle for steering the vehicle during the reverse drive maneuver. The controller furthermore receives a hitch angle representing an angle between the vehicle and the trailer at the hitch. The controller determines a directional jackknife warning condition that represents a condition of the hitch angle for which, given the current vehicle steering angle, an allowable trailer steering angle that reduces the vehicle-trailer hitch angle if the vehicle drives in reverse cannot be found. The driver is then notified if the measured hitch angle falls in the range of angles bounded by the determined directional jackknife warning condition.

In one embodiment, the controller solves a vehicle-trailer mathematical model based on properties of the vehicle and the trailer (e.g., mass of the vehicle, mass of the trailer, the dimensions of the vehicle, the dimensions of the trailer, etc). In other embodiments, the controller uses a lookup table stored in a repository to determine the directional jackknife warning condition. The controller may further use an interpolation algorithm to determine the directional jackknife warning condition for the current set of parameters based on the data available in the repository.

In some embodiments, the controller may additionally determine an absolute jackknife sufficiency condition that represents a range of hitch angles for which a vehicle steering angle and trailer steering angle combination that reduces the vehicle-trailer hitch angle cannot be found. The driver is then notified if the measured hitch angle falls in the range of angles bounded by the determined absolute jackknife warning condition.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

Figure (FIG. 1 is a geometric model of a vehicle with an attached trailer at a hitch point in accordance with an embodiment.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION OF EMBODIMENTS

Embodiments are now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

Overview

A jackknife controller and control method notifies a driver of a potential jackknifing situation when backing up a vehicle attached to a trailer. The vehicle has a rear axle with non-steerable rear wheels and a front axle with steerable front wheels controlled by the driver. The trailer has a front axle with non-steerable front wheels and a rear axle with steerable rear wheels controlled by a trailer steering controller. In a semi-autonomous backing up scenario, the driver fully controls steering and speed of the vehicle during the backup maneuver while the trailer steering controller automatically controls steering of the trailer in response to the driver's actions.

The jackknife controller identifies a directional jackknife warning condition ($\theta_{cr,d}$) and determines whether the vehicle-trailer hitch angle violates the directional jackknife warning condition ($\theta_{cr,d}$). As used herein, the directional jackknife warning condition ($\theta_{cr,d}$) is met when given the current vehicle steering angle, no trailer steering angle exists that would reduce the hitch angle between the vehicle and the trailer if the vehicle drives in reverse. Thus, when this condition is reached, the controller will not be able to prevent jackknifing solely by changing the trailer steering angle, and the driver will have to take some action to avoid jackknifing either by changing the vehicle steering angle or pulling the vehicle forward. In some embodiments, the directional jackknife warning condition ($\theta_{cr,d}$) is met when the hitch angles falls outside of a range of angles defined by a minimum directional jackknife warning angle ($\theta_{cr,d}^-$) and a maximum directional jackknife warning angle ($\theta_{cr,d}^+$). The minimum and maximum directional jackknife warning angles therefore define a range of hitch angles for which, given the current vehicle steering angle, a trailer steering angle that would reduce the hitch angle can be found.

In one embodiment, the jackknife controller continuously determines the directional jackknife warning condition, based on the vehicle steering angle, and notifies the driver when the vehicle-trailer hitch angle violates the directional jackknife warning condition.

The jackknife controller may additionally identify an absolute jackknife warning condition ($\theta_{cr,a}$) and determine whether the vehicle-trailer hitch angle violates the absolute jackknife warning condition ($\theta_{cr,a}$). As used herein, the absolute jackknife warning condition ($\theta_{cr,a}$) is met when for any possible vehicle steering angle, no trailer steering angle exists that would reduce the hitch angle between the vehicle and the trailer if the vehicle drives in reverse. Thus, when this condition is reached, the controller will not be able to prevent jackknifing by changing the trailer steering angle, and the driver will not be able to prevent jackknifing by changing the vehicle steering angle. Rather, under this condition, the only way to prevent jackknifing is for the driver to stop backing up the vehicle. In some embodiments, the absolute jackknife warning condition ($\theta_{cr,a}$) is met when the hitch angle falls outside a range of angles defined by a minimum absolute jackknife warning angle ($\theta_{cr,a}^-$) and a maximum absolute jackknife warning angle ($\theta_{cr,a}^+$). $\theta_{cr,a}^-$ and $\theta_{cr,a}^+$ therefore define a range of hitch angles for which a trailer steering angle and vehicle steering angle combination that would reduce the hitch angle can be found.

The jackknife controller may also notify the driver if the vehicle-trailer hitch angle violates the absolute jackknife warning condition ($\theta_{cr,a}$). In one embodiment, the jackknife controller issues a different notification for a violation of the directional jackknife warning condition and the absolute jackknife warning condition.

Figure 1:
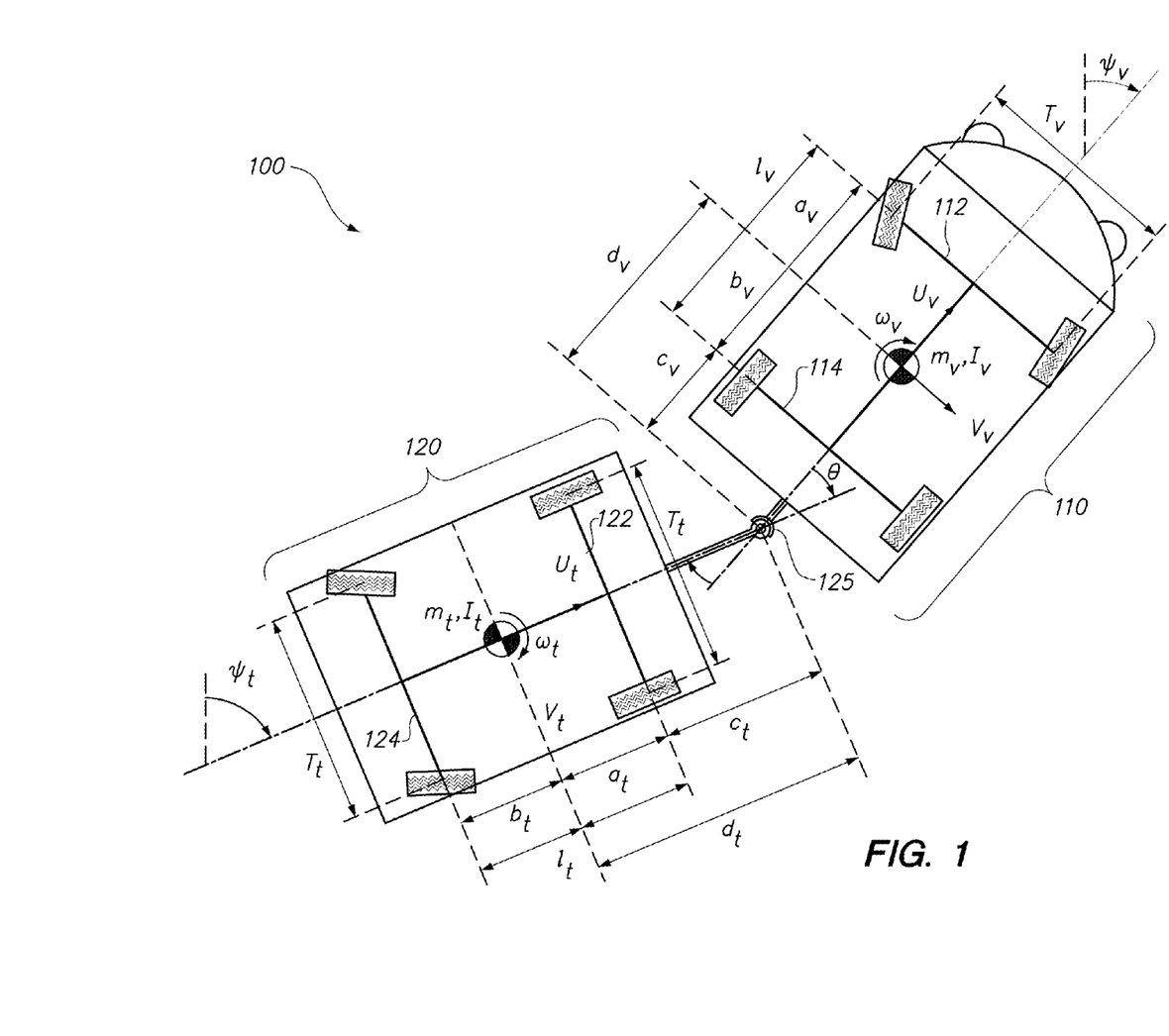

FIG. 1 is a geometric model of a vehicle and trailer system 100 having a vehicle 110 coupled to a trailer 120 at a hitch point 125. The vehicle 110 comprises a dual-axle vehicle with a front axle 112 and a rear axle 114. The front wheels (coupled to the front axle 112) are steerable and the rear wheels (coupled to the rear axle 114) are not. The trailer 120 comprises a dual-axle trailer with a front axle 122 having non-steerable front wheels and a rear axle 124 having steerable rear wheels. The vehicle 110 and trailer 120 are connected by a single degree-of-freedom un-actuated hitch 12. The hitch 125 allows relative yaw motion between the vehicle 110 and the trailer 120 about a horizontal planar surface.

The vehicle 110 has a mass $m_v$, track width $T_v$ (i.e., a distance between the wheels on a given axle), and a wheel base (i.e., a distance between the axles) $l_v = a_v + b_v$, where $a_v$ is a longitudinal distance from the vehicle's center of mass (CoM) to the front axle 112, and $b_v$ is a longitudinal distance from the vehicle's CoM to the rear axle 114. The longitudinal distance from the rear axle 114 of the vehicle 110 to the hitch point 125 is represented by $c_v$. The longitudinal distance from the vehicle's CoM to the hitch point 125 is represented by $d_v = b_v + c_v$. $U_v$ and $V_v$ represent the velocity vectors of the vehicle's CoM in the longitudinal and lateral directions respectively. $\psi_v$ represents the global yaw angle of the vehicle 110 measured clockwise positive from vertical when viewed from the top. $\omega_v = \dot{\psi}_v$ represents the yaw rate of the vehicle 110. $I_v$ represents the vehicle yaw moment of inertia about the CoM.

The trailer 120 has a mass $m_t$, a track width $T_t$, and a wheel base $l_t = a_t + b_t$, where $a_t$ is a longitudinal distance from the trailer's center of mass (CoM) to the front axle 122, and $b_t$ is a longitudinal distance from the trailer's CoM to the rear axle 124. The longitudinal distance from the front axle 122 of the trailer 120 to the hitch point 125 is represented by $c_t$. The longitudinal distance from the trailer's CoM to the hitch point 125 is represented by $d_t = a_t + c_t$. $U_t$ and $V_t$ represent the velocity vectors of the trailer's CoM in the longitudinal and lateral directions respectively. $\psi_t$ represents the global yaw angle of the trailer 120 measured clockwise positive from vertical when viewed from the top. $\omega_t = \dot{\psi}_t$ represents the yaw rate of the trailer 120. $I_t$ represents the trailer yaw moment of inertia about the CoM.

The vehicle 110 and the trailer 120 form an angle $\omega = \psi_t - \psi_v$ at the hitch point 125 measured clockwise positive when viewed from the top. The hitch angle $\theta$ is thus equivalent to the relative orientation of the trailer 120 relative to the vehicle 110.

Figure 2:
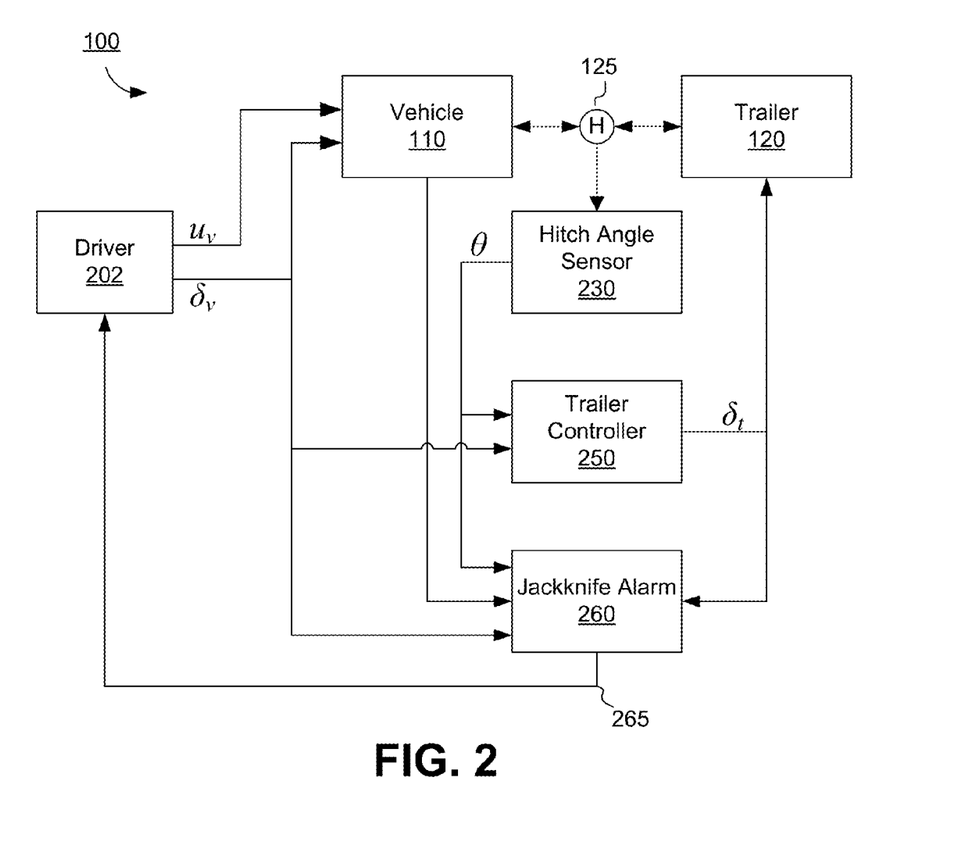
FIG. 2 is a block diagram of a vehicle/trailer system in accordance with an embodiment.

FIG. 2 is a block diagram representation of the vehicle/trailer system 100. A driver 202 provides inputs that control a steering angle $\delta_v$ (e.g., using a steering wheel) and a forward velocity $U_v$ in the steered direction (e.g., using the gas pedal) for driving the vehicle 110. A hitch angle $\theta$ represents the difference in the global yaw angles between the vehicle 110 and the trailer 120, defined herein from the symmetry axis of the trailer 120 to that of the vehicle 110. This hitch angle $\theta$ is sensed by the hitch angle sensor 230. The sensed hitch angle 8 and the vehicle steering angle $\delta_v$ are provided to a trailer controller 250 which generates a trailer steering angle $\delta_t$ that controls steering of the trailer 120. For example, in one embodiment, the trailer controller 250 sends a signal to an actuator controller of the trailer that controls a steering actuator coupled to the rear wheels.

The controller 250 determines the steering angle $\delta_t$ of the trailer such that vehicle 110 and trailer 120 substantially follow the desired path of the driver 202 while avoiding binding or jackknifing during reverse maneuvers to the extent the trailer controller 250 is capable. For example, in one embodiment, the controller 250 controls the trailer steering angle $\delta_t$ of the rear wheels of the trailer in order to maintain the vehicle and trailer substantially under no slip conditions as described in U.S. patent application Ser. No. 13/734,764, titled "Reverse Drive Assist for Long Wheelbase Dual Axle Trailers" filed Jan. 4, 2013. In alternative embodiments, a different control algorithm may be used.

The vehicle-trailer system 100 also includes the jackknife alarm 260 which notifies the driver 202 of a possible jackknife condition. The jackknife alarm 260 may comprise, for example, a controller that performs the functions described herein. In one embodiment, the jackknife alarm 260 may be implemented with a processor and a computer-readable storage medium that stores program instructions executable by the processor for carrying out the functions described herein.

The jackknife alarm 260 receives as input the vehicle steering angle $\delta_v$, the trailer steering angle $\delta_t$, and the vehicle/trailer hitch angle $\theta$, and determines a jackknife warning condition 265. Since the controller 250 only controls the trailer steering $\delta_t$, and the driver has control over the vehicle steering angle $\delta_v$, under certain conditions, the controller 250 may not be able to steer the trailer in a way that avoids binding or jackknifing. If the jackknife alarm 260 determines that the controller 250 cannot avoid binding or jackknifing by changing the trailer steering angle $\delta_t$, the jackknife alarm 260 notifies the driver 202 so the driver 202 can perform corrective measures (e.g., changing the vehicle steering angle $\delta_v$, changing the vehicle velocity, driving forward, etc) to avoid jackknifing. The jackknife alarm 260 determines the jackknife warning condition before the vehicle/trailer system had jackknifed. For example, the jackknife alarm 260 may notify the driver 202 if maintaining the current steering angle while backing up will cause the hitch angle between the vehicle and the trailer to increase towards a jackknife condition. In this situation, the driver 202 may change the vehicle steering angle to avoid binding or jackknifing the trailer and the vehicle. Additionally, the jackknife alarm 260 may notify the driver 202 if a backing up will cause the hitch angle between the vehicle and the trailer to increase towards a jackknife condition regardless of the vehicle steering angle. In this situation, the driver may avoid binding or jackknifing the trailer and the vehicle only be stopping the vehicle or driving forward.

Figure 3:
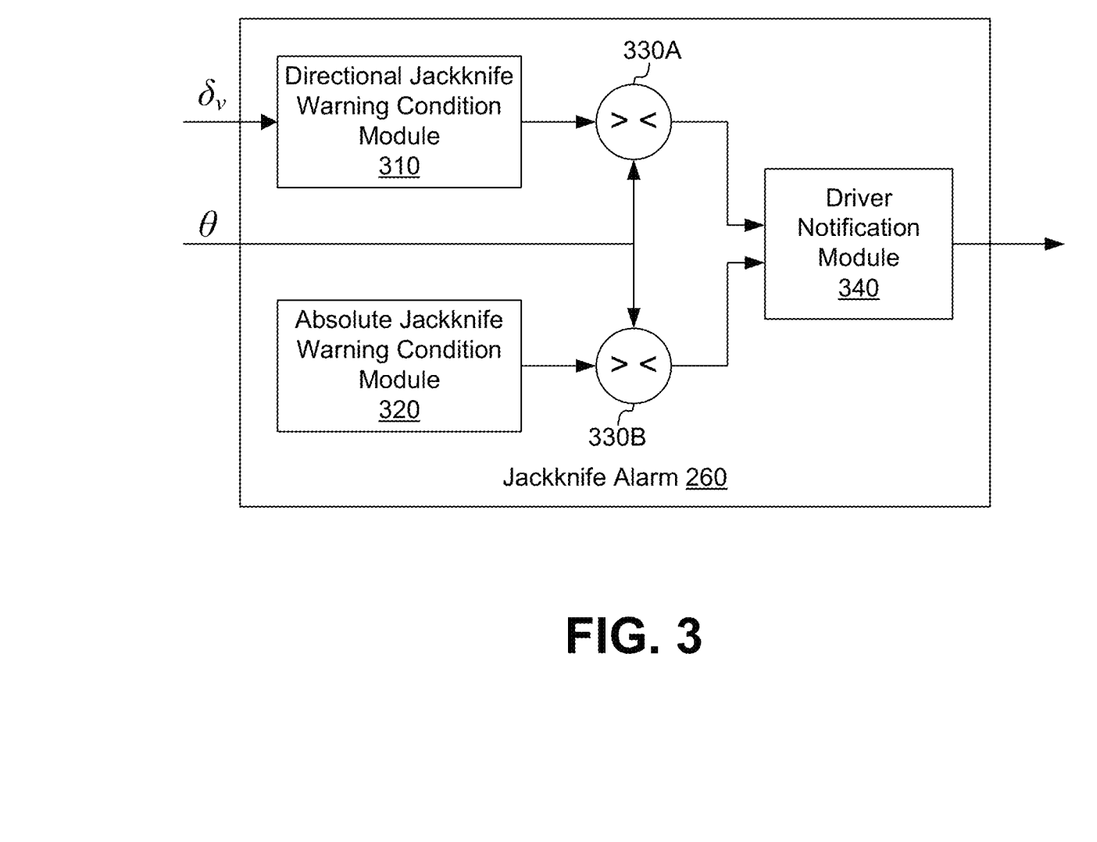
FIG. 3 is a block diagram of a jackknife alarm controller for controlling steering of a trailer in accordance with an embodiment.

FIG. 3 is a block diagram illustrating an embodiment of the jackknife alarm 260. In one embodiment, the jackknife alarm 260 comprises a directional jackknife warning condition module 310, an absolute jackknife warning condition module 320, one or more comparators 330, and a driver notification module 340.

In one embodiment, the jackknife alarm 260 uses a mathematical model of a vehicle-trailer system to determine the outcome of a driver's maneuver. For example, the mathematical model for a vehicle coupled to a long-wheelbase trailer with rear axle steering may be given as:

$$m_v(\dot{U}_v - V_v \omega_v) + m_t(\dot{U}_t - V_t \omega_t)\cos\theta - m_t(\dot{V}_t + U_t \omega_t)\sin\theta = \Sigma F_{xv} + \Sigma F_{xt}\cos\theta - \Sigma F_{yt}\sin\theta \quad (1)$$

$$m_v(\dot{V}_v-U_v\omega_v)+m_t(\dot{U}_t-V_t\omega_t)\sin\theta-m_t(\dot{V}_t+U_t\omega_t)\cos\theta=\Sigma F_{yv}+\Sigma F_{xt}\sin\theta+\Sigma F_{yt}\cos\theta \quad (2)$$

$$I_v\dot{\omega}_v+d_v\cdot m_v(\dot{V}_v+U_v\omega_v)=\Sigma M_v+d_v\cdot\Sigma F_{yv} \quad (3)$$

$$I_t\dot{\omega}_t-d_t\cdot m_v[(\dot{U}_v-V_v\omega_v)\sin\theta-(\dot{V}_v+U_v\omega_v)\cos\theta]=\Sigma M_t-d_t\cdot(\Sigma F_{xv}\sin\theta\Sigma F_{yv}\cos\theta) \quad (4)$$

where $\Sigma F_{xv}$ is the sum of forces acting on the vehicle in the longitudinal direction due to tire forces, $\Sigma F_{yv}$ is the sum of forces acting on the vehicle in the lateral direction due to tire forces, $\Sigma F_{xt}$ is the sum of forces acting on the trailer in the longitudinal direction due to tire forces, $\Sigma F_{yt}$ is the sum of forces acting on the trailer in the lateral direction due to tire forces, $\Sigma M_v$ is the sum of moments about the CoM on the vehicle due to tire forces, and $\Sigma M_t$ is the sum of moments about the CoM on the trailer due to tire forces. Equation 1 represents the summation of forces present in the vehicle-trailer system in the x-axis. Equation 2 represents the summation of forces present in the vehicle-trailer system in the y-axis. Equation 3 represents the summation of yaw moments about the vehicle CoM. Equation 4 represents the summation of yaw moments about the trailer CoM.

At steady state (SS), the linear and rotational accelerations relative to the vehicle are zero ($\dot{U}_v=\dot{V}_v=\dot{U}_t=\dot{V}_t=\dot{\omega}_v=\dot{\omega}_t=0$). Furthermore, the equations above may be solved for a constant hitch angle ($\dot{\theta}=0$, or $\omega_v=\omega_t=\omega$). In this case, the mathematical model reduces to:

$$0=\Sigma F_{xv}+\Sigma F_{xt}\cos\theta_{SS}-\Sigma F_{yt}\sin\theta_{SS}+[(m_v+m_t)V_v-m_t\omega(d_v+d_t\cos\theta_{SS})]\omega \quad (5)$$

$$0=\Sigma F_{yv}+\Sigma F_{xt}\sin\theta_{SS}+\Sigma F_{yt}\cos\theta_{SS}-[(m_v+m_t)U_v+m_td_t\omega\sin\theta_{SS}]\omega \quad (6)$$

$$0=\Sigma M_v+d_v\cdot(\Sigma F_{yv}-m_vU_v\omega) \quad (7)$$

$$0=\Sigma M_t-d_t\cdot[\Sigma F_{xv}\sin\theta_{SS}-\Sigma F_{yv}\cos\theta_{SS}+m_v(U_v\cos\theta_{SS}+V_v\sin\theta_{SS})\omega]\dot{\theta}_{SS} \quad (8)$$

The directional jackknife warning condition module 310 receives the vehicle steering angle and determines the directional jackknife warning condition ($\theta_{cr,d}$). The directional jackknife warning condition is met when the hitch angle $\theta$ falls outside the range of angles defined by the minimum directional jackknife warning angle $\theta_{cr,d}^-$ and the maximum directional jackknife angle $\theta_{cr,d}^+$. In one embodiment, the minimum direction jackknife warning angle $\theta_{cr,d}^-$ and the maximum directional jackknife warning angle $\theta_{cr,d}^+$ are determined as:

$$\theta_{cr,d}^+=\max\theta_{SS}|_{\delta_v}\forall\delta_{t,min}\leq\delta_t\leq\delta_{t,max} \quad (9)$$

$$\theta_{cr,d}^-=\min\theta_{SS}|_{\delta_v}\forall\delta_{t,min}\leq\delta_t\leq\delta_{t,max} \quad (10)$$

The absolute jackknife warning condition module 320 determines the absolute jackknife warning condition ($\theta_{cr,a}$). The absolute jackknife warning condition is met when the hitch angle $\theta$ falls outside the range of angles defined by the minimum absolute jackknife warning angle $\theta_{cr,a}^-$ and the maximum absolute jackknife angle $\theta_{cr,a}^+$. In one embodiment, the minimum absolute jackknife warning angle $\theta_{cr,a}^-$ and the maximum absolute jackknife angle $\theta_{cr,a}^+$ are determined as:

$$\theta_{cr,a}^+=\max\theta_{ss}\begin{cases}\forall\delta_{t,min}\leq\delta_t\leq\delta_{t,max}\\\forall\delta_{v,min}\leq\delta_v\leq\delta_{v,max}\end{cases} \quad (11)$$

$$\theta_{cr,a}^-=\min\theta_{ss}\begin{cases}\forall\delta_{t,min}\leq\delta_t\leq\delta_{t,max}\\\forall\delta_{v,min}\leq\delta_v\leq\delta_{v,max}\end{cases} \quad (12)$$

The comparator 330A is configured to determine if the directional jackknife warning condition is met based on the hitch angle between the vehicle and the trailer. In some embodiments, the comparator 330A may determine whether the hitch angle is outside the range defined by the minimum directional jackknife warning angle ($\theta_{cr,d}^-$) and the maximum directional jackknife warning angle ($\theta_{cr,d}^+$). In other embodiments, the comparator 330A may enforce a buffer ($\theta_{cr,d}^{buffer}$) between the hitch angle and $\theta_{cr,d}^-$ and $\theta_{cr,d}^+$ such that a notification is triggered when the hitch angle is within a predetermined angular distance of satisfying the directional jackknife warning condition. In other words, the comparator 330A may determine that the directional jackknife warning condition is met when the hitch angle is outside the range defined by $\theta_{cr,d}^-+\theta_{cr,d}^{buffer}$ and $\theta_{cr,d}^+-\theta_{cr,d}^{buffer}$.

The comparator 330B is configured to determine if the absolute jackknife warning condition is met based on the hitch angle between the vehicle and the trailer. In some embodiments, the comparator 330B may determine whether the hitch angle is outside the range defined by the minimum absolute jackknife warning angle ($\theta_{cr,a}^-$) and the maximum absolute jackknife warning angle ($\theta_{cr,a}^+$). In other embodiments, the comparator 330B may enforce a buffer ($\theta_{cr,a}^{buffer}$) between the hitch angle and $\theta_{cr,d}^-$ and $\theta_{cr,a}^+$ such that a notification is triggered when the hitch angle is within a predetermined angular distance of satisfying the directional jackknife warning condition. In other words, the comparator 330A may determine that the absolute jackknife warning condition is met when the hitch angle is outside the range defined by $\theta_{cr,a}^-+\theta_{cr,a}^{buffer}$ and $\theta_{cr,a}^{buffer}-\theta_{cr,a}^{buffer}$. In some embodiments, comparator 330A and the comparator 330B are the same comparator.

The driver notification module 340 is configured to notify the driver if the hitch angle meets the directional jackknife warning condition ($\theta_{cr,d}$) or the absolute jackknife warning condition ($\theta_{cr,a}$). In one embodiment, different notifications may be sent to the driver when the hitch angle meets the directional jackknife warning condition and the absolute jackknife warning condition. For example, if the hitch angle meets the directional jackknife warning condition, the driver notification module 340 may send a notification to the driver to either change the steering angle or drive the vehicle forward. Additionally, if the hitch angle meets the absolute jackknife warning condition, the driver notification module 340 may send a notification to the driver to drive the vehicle forward, since changing the vehicle steering angle may not result in a reduction of the hitch angle.

In some embodiments, the driver notification module plays a sound to alert the driver 202 that the hitch angle between the vehicle and the trailer has met $\theta_{cr,d}$ and/or $\theta_{cr,a}$. In other embodiments, the driver notification module 340 turns on a notification light in the driver's dashboard. In yet other embodiments, the driver notification module includes a display that displays the actual hitch angle with respect to $\theta_{cr,d}$ and $\theta_{cr,a}$.

Figure 4:
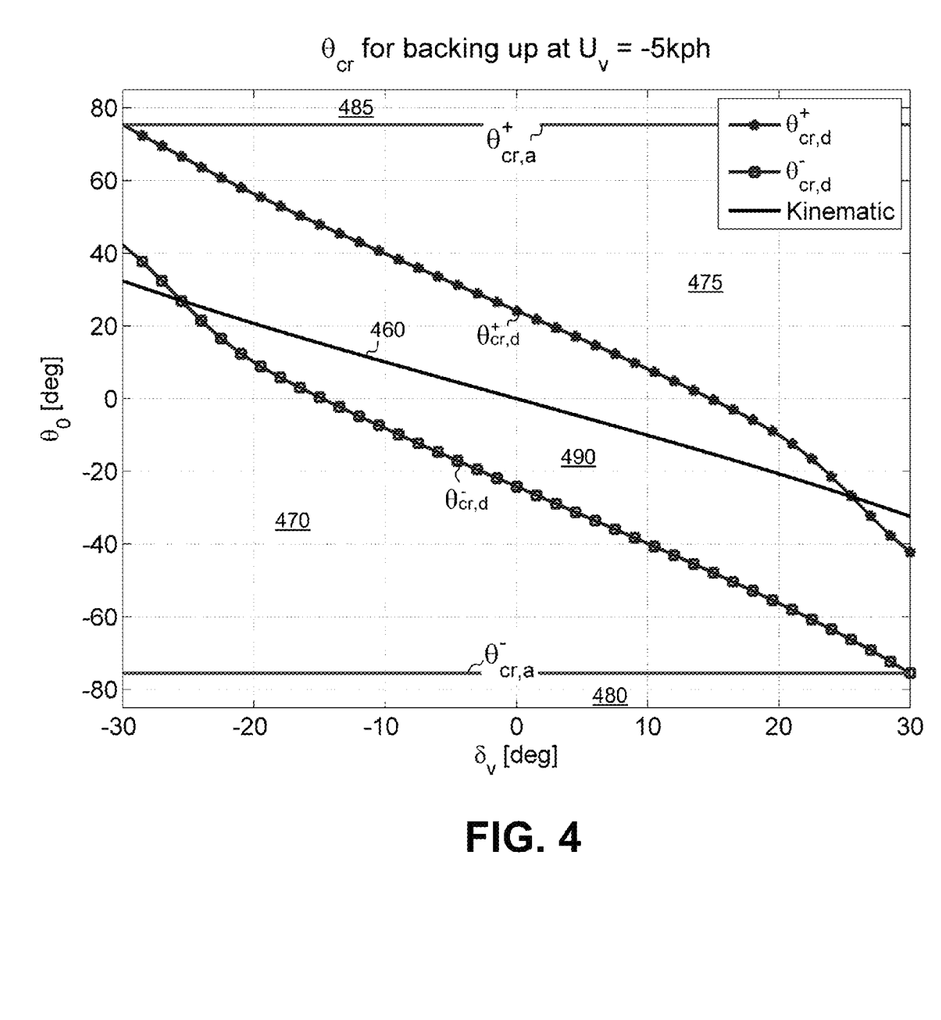
FIG. 4 is a graph illustrating the directional jackknife warning condition and the absolute jackknife warning condition for a vehicle-trailer system in accordance with an embodiment.

FIG. 4 illustrates a graph showing the maximum directional jackknife warning angle ($\theta_{cr,d}^+$) and the minimum directional jackknife warning angle ($\theta_{cr,d}^-$) as a function of vehicle steering angle. The graph of FIG. 4 also shows the maximum absolute jackknife warning angle ($\theta_{cr,a}^+$) and the minimum absolute jackknife warning angle ($\theta_{cr,a}^-$). Additionally, a solution 460 of the vehicle-trailer model assuming kinematic motion and no slip in the longitudinal or lateral direction is shown in the graph of FIG. 4. The graph of FIG. 4 was calculated for a vehicle by solving equations (5) though (8) with a vehicle steering angle that ranges from −30° to +30° (−30°≤$\delta_v$≤30°), a trailer with a steering angle that ranges from −20° to +20° (−20°≤$\delta_t$≤20°) and a vehicle velocity of −5 kilometers per hour (−5 km/h or −5 kph). For example, for a vehicle steering angle of 10°, the minimum directional jackknife warning angle is about −40° and the maximum directional jackknife warning angle is about 8°. Additionally, for the vehicle steering angle of 10°, the minimum absolute jackknife warning angle is about −75° and the maximum absolute jackknife warning angle is about 75°.

The graph shown in FIG. 4 defines five regions 470, 475, 480, 485 and 490.

Region 490 has the minimum directional jackknife warning angle ($\theta_{cr,d}^-$) and the minimum absolute jackknife warning angle ($\theta_{cr,a}^-$) as lower bounds, and the maximum directional jackknife warning angle ($\theta_{cr,d}^+$) and the maximum absolute jackknife warning angle ($\theta_{cr,a}^+$) as upper bounds. If a vehicle-trailer system 100 has a hitch angle θ and vehicle steering angle $\delta_v$ that places the vehicle-trailer system 100 in region 490, then no warning is issued from the jackknife alarm 260, since the hitch angle θ does not meet the directional jackknife warning condition or the absolute jackknife warning condition.

Region 470 has the minimum absolute jackknife warning angle ($\theta_{cr,a}^-$) as a lower bound and the minimum directional jackknife warning angle ($\theta_{cr,d}^-$) as an upper bound. If a vehicle-trailer system 100 has a hitch angle θ and vehicle steering angle $\delta_v$ that places the vehicle-trailer system 100 in region 470, then the directional jackknife warning condition ($\theta_{cr,d}$) is met and the jackknife alarm 260 notifies the driver to increase the steering angle in order to reduce the hitch angle θ. For example, if the hitch angle θ of the vehicle-trailer system 100 is −20° and the vehicle steering angle $\delta_v$ is −20°, the jackknife alarm 260 may notify the driver 202 to increase the steering angle $\delta_v$ (e.g., to a value between 5° and 25°) until the vehicle-trailer system is back in the region 490.

Region 475 has the maximum directional jackknife warning angle ($\theta_{cr,d}^+$) as a lower bound and the maximum absolute jackknife warning angle ($\theta_{cr,a}^+$) as an upper bound. If a vehicle-trailer system 100 has a hitch angle θ and vehicle steering angle $\delta_v$ that places the vehicle-trailer system 100 in region 475, then the directional jackknife warning condition ($\theta_{cr,d}$) is met and the jackknife alarm 260 notifies the driver to decrease the steering angle in order to reduce the hitch angle θ. For example, if the hitch angle θ of the vehicle-trailer system 100 is 20° and the vehicle steering angle $\delta_v$ is 20°, the jackknife alarm 260 may notify the driver 202 to decrease the steering angle $\delta_v$ (e.g., to a value between −5° and −25°) until the vehicle-trailer system is back in the region 490.

Region 480 has the minimum absolute jackknife warning angle ($\theta_{cr,a}^-$) as an upper bound. If a vehicle-trailer system 100 has a hitch angle θ and vehicle steering angle $\delta_v$ that places the vehicle-trailer system 100 in region 480, then the absolute jackknife warning condition ($\theta_{cr,a}$) is met and the jackknife alarm 260 notifies the driver to drive forward in order to reduce the hitch angle θ. For example, if the hitch angle θ of the vehicle-trailer system 100 is −45°, the jackknife alarm 260 may notify the driver 202 to drive forward.

Region 485 has the maximum absolute jackknife warning angle ($\theta_{cr,a}^+$) as a lower bound. If a vehicle-trailer system 100 has a hitch angle θ and vehicle steering angle $\delta_v$ that places the vehicle-trailer system 100 in region 485, then the absolute jackknife warning condition ($\theta_{cr,a}$) is met and the jackknife alarm 260 notifies the driver to drive forward in order to reduce the hitch angle θ. For example, if the hitch angle θ of the vehicle-trailer system 100 is 45°, the jackknife alarm 260 may notify the driver 202 to drive forward.

In some embodiments, the directional jackknife warning condition module 310 and the absolute jackknife warning condition module 320 stores a pre-populated table representing a curve similar to the one depicted in FIG. 4 to determine the directional jackknife warning condition ($\theta_{cr,d}$) and the absolute jackknife warning condition ($\theta_{cr,a}$). In other embodiments, the solution of equations (5) through (8) may be pre-calculated and a table containing the solution of equations (5) through (8) may be stored in the directional jackknife warning condition module 310 and/or the absolute jackknife warning condition module 320. The values stored in the table may then be used by the directional jackknife warning condition module and the absolute jackknife warning condition module to determine the directional jackknife warning condition ($\theta_{cr,d}$) and the absolute jackknife warning condition ($\theta_{cr,a}$) for any given vehicle steering angle and vehicle speed. In some embodiments, an optional jackknife critical angle mapping store (not shown in figures) may be included in the jackknife alarm 260 to store the pre-calculated solutions to equation (5) through (8). In one embodiment, the jackknife critical angle mapping store includes the pre-calculated solutions for different vehicle velocities, vehicle weights, trailer weights, etc. The directional jackknife warning condition module 310 and the absolute jackknife warning condition module 320 may use the jackknife critical angle mapping stores to determine $\theta_{cr,d}$ and $\theta_{cr,a}$. The directional jackknife warning condition module 310 and the absolute jackknife condition module 320 may use an interpolating algorithm to determine $\theta_{cr,d}$ and $\theta_{cr,a}$ based on the values available in the jackknife critical angle store. For instance the directional jackknife condition module 310 and the absolute jackknife condition module 320 may use linear interpolation to determine the values of $\theta_{cr,d}$ and $\theta_{cr,a}$ based in the values available in the jackknife critical angle store.

In other embodiments, the directional jackknife warning condition module 310 and the absolute jackknife warning condition module 320 may include a microprocessor that can solve equations (5) through (8) based on input parameters obtained from different sensors (e.g., vehicle velocity, vehicle mass, trailer mass, etc.).

In some embodiments, the jackknife alarm 260 may be pre-programmed to be used with a specific vehicle. The jackknife alarm 260 may for example, include a pre-programmed model of the vehicle and may allow the driver or other individual to input the trailer parameters (e.g., trailer dimensions, trailer weight, etc). The jackknife alarm 260 may also include the pre-calculated solutions to equations (5) through (8) based on parameters intrinsic to the vehicle (e.g., vehicle dimensions). In some embodiments, the jackknife alarm may be pre-programmed to be used with a pre-determined set of vehicle models and the driver, the vehicle manufacturer, the vehicle dealer, or the like may input which vehicle the jackknife alarm 260 will be used for.

In other embodiments, the jackknife alarm 260 may be pre-programmed to be used with a specific trailer. The jackknife alarm 260 may for example, include a pre-programmed model of the trailer and may allow the driver to input the vehicle parameters (e.g., trailer dimensions, trailer weight, etc). The jackknife alarm 260 may also include the pre-calculated solutions to equations (5) through (8) based on parameters intrinsic to the trailer (e.g., vehicle dimensions). In some embodiments, the jackknife alarm 260 may be pre-programmed to be used with a specific trailer and multiple vehicle models. The driver may then be able to input the vehicle model the trailer is attached to prior to using the jackknife alarm 260.

In other embodiments, the jackknife alarm 260 may be a generic device and the driver, vehicle manufacturer, trailer manufacturer, vehicle dealer, or the like may program the jackknife alarm 260 by inputting the specific parameters associated to the vehicle and the trailer. In one embodiment, the jackknife alarm may include a device to measure the weight of the vehicle and/or the trailer (e.g., by measuring the load on each axle, or by measuring the pressure in the tires).

Figure 5A:
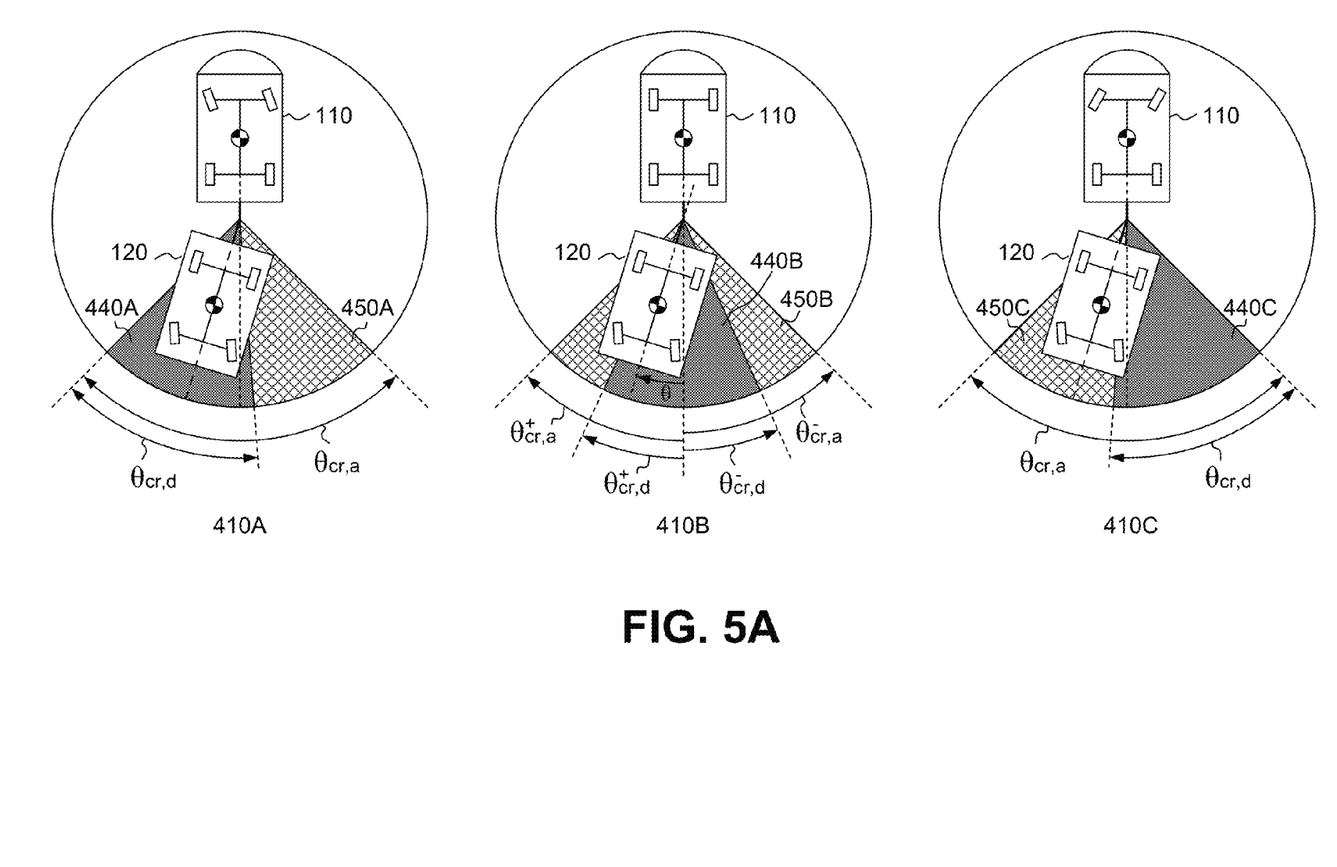
FIG. 5A is a graph illustrating the directional jackknife warning condition and the absolute jackknife warning condition for three different vehicle steering angles in accordance with an embodiment.

FIG. 5A illustrates how the directional jackknife warning condition ($\theta_{cr,d}$) changes as the driver 202 changes the vehicle steering angle. Diagrams 410A, 410B, and 410C illustrate a range of angles 450 bounded by the minimum and maximum absolute jackknife warning conditions and a range of angles 440 bounded by the minimum and maximum directional jackknife warning angles. Diagram 410A corresponds to a vehicle steering to the left (e.g., $\delta_v$=30°), diagram 410B corresponds to a vehicle with a steering angle of 0°, and diagram 410C corresponds to a vehicle steering to the right (e.g., $\delta_v$=+30°). If no other parameters (e.g., vehicle velocity, vehicle mass, trailer mass, etc) changes, the range of angles 450 bounded by the minimum and maximum absolute jackknife warning angles will be the same for all three diagrams 410A, 410B, 410C since the absolute jackknife warning condition is not dependent on vehicle steering angle. In diagram 410A, since the vehicle is steering to the left, the range of angles 440A bounded by the minimum and maximum directional jackknife warning angles is located in the region mostly corresponding to a positive hitch angle θ. As can be seen in diagram 410A, the hitch angle θ is within the permissible range of angles bounded by the minimum and maximum directional jackknife warning angles 440A. As the driver changes the steering from left to right, the range of angles 440 bounded by the minimum and maximum directional jackknife warning angles also moves to the right (counterclockwise). For instance, in diagram 410B, the driver changed the steering angle of the vehicle from $\delta_v$=30° to $\delta_v$=0. As a result the range of angles 440A bounded by the minimum and maximum directional jackknife warning angles rotates counterclockwise to become range of angles 440B. In diagram 410B, the hitch angle θ is still within the permissible range of angles bounded by the minimum and maximum directional jackknife warning angles, as a result, the jackknife alarm 260 would not notify the driver 202. If the driver 202 keeps changing the steering angle of the vehicle (e.g., to $\delta_v$=+30°), the range of angles 440 bounded by the minimum and maximum directional jackknife warning angles would move to the range of angles 440C. As can be seen in diagram 410C, the hitch angle θ is no longer within the permissible range of angles 440C bounded by the minimum and maximum directional jackknife warning angles. As a result the jackknife alarm 260 may notify the driver to change the steering angle of the vehicle if the driver desires to reduce the hitch angle between the vehicle and the trailer.

Figure 5B:
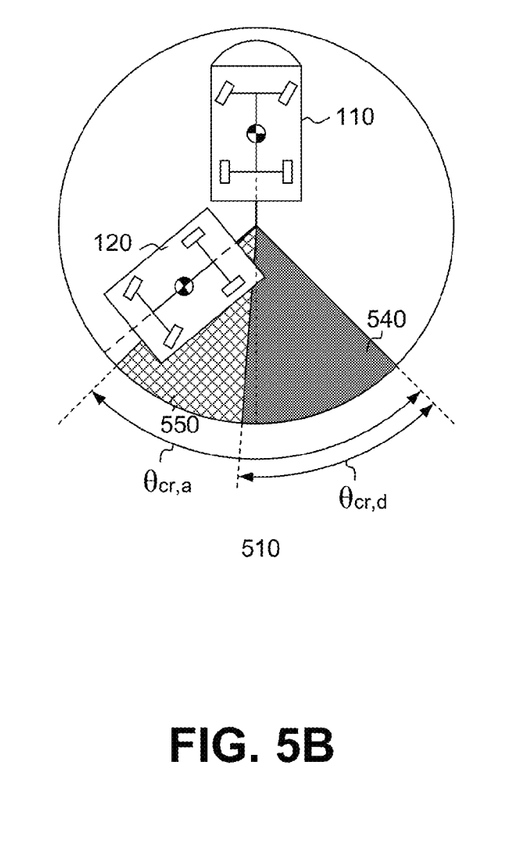
FIG. 5B is a graph illustrating the directional jackknife warning condition and the absolute jackknife warning condition when the vehicle-trailer hitch angle satisfies the absolute jackknife warning condition in accordance with an embodiment.

During the backing up of a vehicle/trailer system 100, the hitch angle θ may move outside the minimum or maximum absolute jackknife warning angles, thus meeting the absolute jackknife warning condition ($\theta_{cr,a}$). FIG. 5B illustrates a diagram 510 similar to diagrams 410. Diagram 510 illustrates a range of angles 550 bounded by the absolute jackknife warning condition and a range of angles 540 bounded by the minimum and maximum directional jackknife warning angles. Diagram 510 corresponds to a vehicle steering to the right (e.g., $\delta_v$=+30°). Additionally, the hitch angle θ is outside of the range of angles bounded by both the minimum and maximum directional jackknife warning angle and the minimum and maximum absolute jackknife warning angle, thus meeting the absolute jackknife warning condition. In this situation, the jackknife alarm 260 may notify the driver to drive forward if the driver desires to reduce the hitch angle between the vehicle and the trailer.

In some embodiments, a diagram similar to diagram 410, 510 may be shown to the driver on the driver's dashboard. Furthermore, the diagram may be continuously updated as the driver changes the driving parameters (e.g., vehicle steering angle, vehicle velocity, etc).

Figure 6:
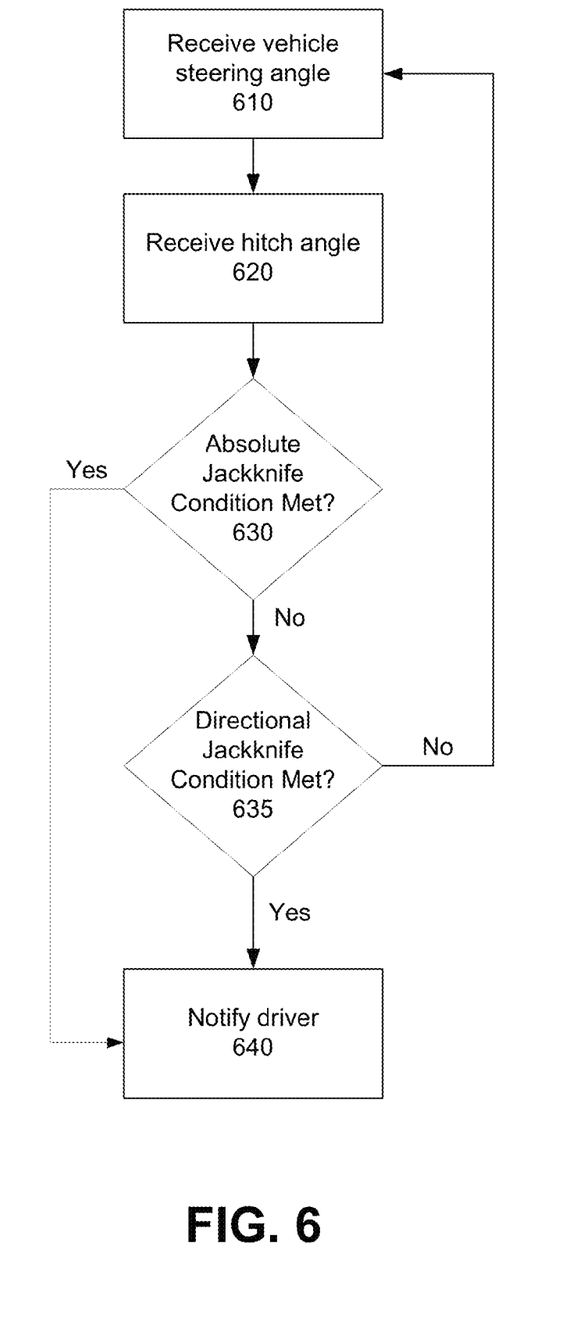
FIG. 6 is a flowchart illustrating a process for notifying a driver of a possible jackknife warning condition in accordance with an embodiment.

FIG. 6 is a flow diagram of a method for notifying a driver of a potential jackknifing condition. In one embodiment, the jackknife alarm 260 receives 610, 620 vehicle steering angle information and vehicle-trailer hitch angle information. The absolute jackknife warning condition module 320 determines 630 if the absolute jackknife warning condition 630 is met. If the absolute jackknife warning condition is met at decision block 630, then the driver notification module 340 notifies 640 the driver of the absolute jackknife warning condition. In some embodiments, the driver notification module 340 notifies 640 the driver to drive forward to reduce the vehicle-trailer hitch angle and prevent jackknife.

If the absolute jackknife warning condition is not met at decision block 630, the directional jackknife condition module 310 determines if the directional jackknife warning condition $\theta_{cr,d}$ is met. If the directional jackknife warning condition is met at decision block 635, then the driver notification module 340 notifies 640 the driver of the directional jackknife warning condition. In some embodiments, the driver notification module 340 notifies 640 the driver to change the vehicle steering angle in order to be able to reduce the vehicle-trailer hitch angle.

Additional Alternative Embodiments

The example embodiments described above include a jackknife alarm controller 260 for determining a directional jackknife warning condition and notifies the driver when the vehicle-trailer hitch angle meets the directional jackknife warning condition ($\theta_{cr,d}$). In an alternative embodiment, the controller allows the driver to continue operating when the directional jackknife warning conditions are met, as long as the absolute jackknife warning condition has not been exceeded. In certain situations, a driver may need to perform certain maneuvers while backing up a vehicle-trailer system that would increase the vehicle-trailer hitch angle.

In one embodiment, the jackknife alarm 260 may be used in conjunction with a trailer rear-wheel steering controller. The jackknife alarm controller may communicate with the trailer rear-wheel steering controller and the trailer rear-wheel steering controller may steer the rear wheels of the trailer based on the position of the hitch angle relative to the directional jackknife warning condition.

In another embodiment, based on the measured hitch angle, the jackknife alarm 260 determines a range of vehicle steering angles that would allow for a reduction of the hitch angle (i.e., that would not result in a jackknife situation).

Upon reading this disclosure, those of skill in the art will appreciate still additional alternative designs having the features described herein. Thus, while particular embodiments and applications have been illustrated and described, it is to be understood that the embodiments are not limited to the precise construction and components disclosed herein and that various modifications, changes and variations which will be apparent to those skilled in the art may be made in the arrangement, operation and details of the embodiments disclosed herein without departing from the spirit and scope of the embodiments as defined in the appended claims.

The invention claimed is:

1. A method for assisting a driver in a reverse drive maneuver of a trailer, the method comprising:
receiving, by a controller device, an operator-controlled vehicle steering angle for steering a vehicle during the reverse drive maneuver;
receiving, by the controller device, a hitch angle representing an angle between the vehicle and the trailer at a hitch wherein the trailer is coupled to the vehicle at the hitch, the vehicle having a front axle with steerable front wheels and a rear axle with non-steerable rear wheels, and the trailer having a rear axle with steerable rear wheels and a front axle with non-steerable front wheels;
determining a directional jackknife warning condition based on the received vehicle steering angle, the directional jackknife warning condition representing a condition of the hitch angle at which, if the vehicle steering angle is maintained, no allowable trailer steering angle can be determined that will reduce the hitch angle between the vehicle and the trailer if the vehicle drives in reverse; and
responsive to the hitch angle satisfying the directional jackknife warning condition, notifying the driver.

2. The method of claim 1, wherein the directional jackknife warning condition is satisfied when the hitch angles falls outside a range of angles bounded by a maximum directional jackknife warning angle and a minimum directional jackknife warning angle.

3. The method of claim 1, wherein the directional jackknife warning condition is further based on at least one of a trailer model, a trailer maximum rear axle steering angle, a trailer weight, a trailer velocity, a trailer moment of inertia, and a vehicle model.

4. The method of claim 1, wherein notifying the driver responsive to the hitch angle satisfying the directional jackknife warning condition comprises:
notifying the driver to change the vehicle steering angle of the vehicle.

5. The method of claim 1 further comprising:
responsive to the hitch angle being within a predetermined angular distance of satisfying the directional jackknife warning condition, notifying the driver to change the vehicle steering angle of the vehicle.

6. The method of claim 1 further comprising:
determining an absolute jackknife warning condition, the absolute jackknife warning condition representing a condition of the hitch angle at which no allowable trailer steering angle can be determined to reduce the hitch angle between the vehicle and the trailer regardless of the vehicle steering angle if the vehicle drives in reverse; and
responsive to the hitch angle satisfying the absolute jackknife warning condition, notifying the driver.

7. The method of claim 6 wherein notifying the driver responsive to the hitch angle satisfying the absolute jackknife warning condition comprises:
notifying the driver to drive the vehicle forward to reduce the hitch angle.

8. A non-transitory computer readable medium configured to store instructions for assisting a driver in a reverse drive maneuver of a trailer, the instructions when executed by a processor cause the processor to:
receive an operator-controlled vehicle steering able for steering a vehicle during the reverse drive maneuver;
receive a hitch angle representing an angle between the vehicle and a trailer at a hitch angle wherein the trailer is coupled to the vehicle at the hitch, the vehicle having a front axle with steerable front wheels and a rear axle with non-steerable rear wheels, and the trailer having a rear axle with steerable rear wheels and a front axle with non-steerable front wheels;
determine a directional jackknife warning condition based on the received vehicle steering angle, the directional jackknife warning condition representing a condition of the hitch angle at which, if the vehicle steering angle is maintained, no allowable steering angle can be determined that will reduce the hitch angle between the vehicle and the trailer if the vehicle drives in reverse; and
responsive to the hitch angle satisfying the directional jackknife warning condition, notify the driver.

9. The non-transitory computer readable medium of claim 8, wherein the directional jackknife warning condition is satisfied when the hitch angles falls outside a range of angles bounded by a maximum directional jackknife warning angle and a minimum directional jackknife warning angle.

10. The non-transitory computer readable medium of claim 8, wherein the directional jackknife warning condition is further based on at least one of a trailer model, a trailer maximum rear axle steering angle, a trailer weight, a trailer velocity, a trailer moment of inertia, and a vehicle model.

11. The non-transitory computer readable medium of claim 8, wherein notifying the driver responsive to the hitch angle satisfying the directional jackknife warning condition causes the processor to:
notify the driver to change the vehicle steering angle of the vehicle.

12. The non-transitory computer readable medium of claim 8 further configured to store instructions that when executed by the processor cause the processor to:
responsive to the hitch angle being within a predetermined angular distance of satisfying the directional jackknife warning condition, notify the driver to change the vehicle steering angle of the vehicle.

13. The non-transitory computer readable medium of claim 8 further configured to store instructions that when executed by the processor cause the processor to:
determine an absolute jackknife warning condition, the absolute jackknife warning condition representing a condition of the hitch angle at which no allowable trailer steering angle can be determined to reduce the hitch angle between the vehicle and the trailer regardless of the vehicle steering angle if the vehicle drives in reverse; and
responsive to the hitch angle satisfying the absolute jackknife warning condition, notify the driver to drive the vehicle forward to reduce the hitch angle.

14. A controller configured for assisting a driver in a reverse drive maneuver of a trailer, the controller comprising:
a processor; and
a non-transitory computer readable medium configured to store instructions, the instructions when executed by the processor cause the processor to:
receive an operator-controlled vehicle steering able for steering a vehicle during the reverse drive maneuver;
receive a hitch angle representing an angle between the vehicle and a trailer at a hitch angle wherein the trailer is coupled to the vehicle at the hitch, the vehicle having a front axle with steerable front wheels and a rear axle with non-steerable rear wheels, and the trailer having a rear axle with steerable rear wheels and a front axle with non-steerable front wheels;

determine a directional jackknife warning condition based on the received vehicle steering angle, the directional jackknife warning condition representing a condition of the hitch angle at which, if the vehicle steering angle is maintained, no allowable steering angle can be determined that will reduce the hitch angle between the vehicle and the trailer if the vehicle drives in reverse; and responsive to the hitch angle satisfying the directional jackknife warning condition, notify the driver.

15. The controller of claim 14, wherein the directional jackknife warning condition is satisfied when the hitch angles falls outside a range of angles bounded by a maximum directional jackknife warning angle and a minimum directional jackknife warning angle.

16. The controller of claim 14, wherein the directional jackknife warning condition is further based on at least one of a trailer model, a trailer maximum rear axle steering angle, a trailer weight, a trailer velocity, a trailer moment of inertia, and a vehicle model.

17. The controller of claim 14, wherein notifying the driver responsive to the hitch angle satisfying the directional jackknife warning condition causes the processor to:

notify the driver to change the vehicle steering angle of the vehicle.

18. The controller of claim 14, wherein the non-transitory computer readable medium is further configured to store instructions that when executed by the processor cause the processor to:

responsive to the hitch angle being within a predetermined angular distance of satisfying the directional jackknife warning condition, notify the driver to change the vehicle steering angle of the vehicle.

19. The controller of claim 14, wherein the non-transitory computer readable medium is further configured to store instructions that when executed by the processor cause the processor to:

determine an absolute jackknife warning condition, the absolute jackknife warning condition representing a condition of the hitch angle at which no allowable trailer steering angle can be determined to reduce the hitch angle between the vehicle and the trailer regardless of the vehicle steering angle if the vehicle drives in reverse; and responsive to the hitch angle satisfying the absolute jackknife warning condition, notify the driver.

20. The controller of claim 19 wherein notifying the driver responsive to the hitch angle satisfying the absolute jackknife warning condition causes the processor to:

notify the driver to drive the vehicle forward to reduce the hitch angle.

* * * * *